US008239249B1

(12) United States Patent
Belko et al.

(10) Patent No.: US 8,239,249 B1
(45) Date of Patent: Aug. 7, 2012

(54) WORK ALLOCATION TOOL

(75) Inventors: Michael Belko, Boerne, TX (US); Matthew Douglas Karam, San Antonio, TX (US); Josue Manuel Perez, San Antonio, TX (US); Richard Edward Wintheiser, Helotes, TX (US); Chad Michael Martin, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 912 days.

(21) Appl. No.: 11/852,165

(22) Filed: Sep. 7, 2007

(51) Int. Cl.
*G06Q 30/00* (2006.01)

(52) U.S. Cl. ..................................... 705/9; 705/4; 705/8

(58) Field of Classification Search .................. 705/8, 9, 705/4
See application file for complete search history.

(56) References Cited

U.S. PATENT DOCUMENTS

| | | | | |
|---|---|---|---|---|
| 4,975,840 | A * | 12/1990 | DeTore et al. ..................... | 705/4 |
| 2003/0126141 | A1* | 7/2003 | Hassman et al. ............. | 707/100 |
| 2005/0004825 | A1* | 1/2005 | Ehrler et al. ...................... | 705/8 |
| 2005/0187881 | A1* | 8/2005 | McGiffin et al. ................ | 705/64 |
| 2006/0047558 | A1* | 3/2006 | Uchiyama et al. ................ | 705/9 |
| 2006/0259472 | A1* | 11/2006 | MacClellan ...................... | 707/3 |
| 2007/0208638 | A1* | 9/2007 | Brown ............................ | 705/35 |

OTHER PUBLICATIONS

Parker, L. and Tang, F. "Building Multirobot Coalitions Through Automated Task Solution Synthesis." Proceedings of the IEEE, Jul. 2006, vol. 94, No. 7, p. 1289-1305.

Mataric, M., Sukhatme, G., and Ostergaard, E. "Multi-Robot Task Allocation in Uncertain Environments." Autonomous Robots, 2003, vol. 14, p. 255-263.

"Taskforce 7.5 gains real-time GPS and mapping." FleetOwner, Aug. 9, 2007, [retrieved from the Internet on Jan. 18, 2008 using <URL: http://fleetowner.com/information_technology/news/taskforce_75_gps_mapping/index.html>].

"Project Management: Task Allocation." Project Management Source, Feb. 5, 2006, [retrieved from the Internet on Jan. 18, 2008 using <URL: http://www.projectmanagementsource.com/2006/02/project_managem.html>].

* cited by examiner

*Primary Examiner* — Nga B. Nguyen
(74) *Attorney, Agent, or Firm* — Brooks, Cameron & Huebsch, PLLC (57) ABSTRACT

Methods and systems are disclosed for automatically allocating work projects to personnel based on work complexity level and level of knowledge and experience of the personnel. In one implementation, the methods and systems provide a work allocation tool that allows a user to input the level of complexity of the work projects according to one or more predefined criteria. The work allocation tool then automatically determines which of the available personnel has the required level of knowledge and experience to complete the work projects. Personnel who have already exceeded a target number or percentage of work projects in a given time period may be automatically excluded from the allocation. The work allocation tool thereafter randomly selects one of the available personnel and automatically allocates the work projects. An administrator interface allows a manager to define each person's target numbers or percentages and to stop further allocations if needed.

19 Claims, 7 Drawing Sheets

Work Allocation Form

Project Number: 1234  ~ 402

Please select employee role.

● Role 1   ○ Role 2   ○ Role 3   ~ 404

Please select dollar value of project.

○ 0-300K   ● 300K-500K   ○ 500K-750K   ○ 750K-1M   ○ >1M   ~ 406

Second approval requested?

○ Second Approval   ~ 408

Employee Selected: John Smith - 54231   ~ 410

[Allocate Project]   [Retrieve Assigned Employee]
        412                   414

[Administrator View]   [Clear Form]   [Change Password]
        416                418             420

|   | A | B | C | D | E | F | G | H | I | J | K | L | M | N | O | P | Q |
|---|---|---|---|---|---|---|---|---|---|---|---|---|---|---|---|---|---|
| 1 | | | | | | | | | | | | | | | | | |
| 2 | | | Calculate Allocation % — 502 | | | | | | | | | | | | | | |
| 3 | | | | | | | | | Work Allocation Summary — 500 | | | | | | | | |
| 4 | | | | | | | | | Band 1 | Band 2 | Band 3 | Band 4 | Band 5 | | | | |
| 5 | Target | Actual | Name | Work? | Max | Special | Approv | Empty | 300K | 500K | 750K | 1M | >1M | Special | Approv | Empty | Limit? |
| 6 | 3.0% | 3.0% | Name 1 | Y | >1M | N | Y | N | 44.0% | 0.5% | 13.0% | 13.0% | 7.0% | 0.0% | 0.0% | 15.0% | Y |
| 7 | 3.0% | 3.0% | Name 2 | Y | >1M | N | Y | N | | | | 0.2% | 0.8% | | | 1.8% | Y |
| 8 | 3.0% | 3.0% | Name 3 | Y | >1M | N | Y | N | | | | 0.2% | 0.8% | | | 1.8% | Y |
| 9 | 3.0% | 3.0% | Name 4 | Y | >1M | N | Y | N | | | | 0.2% | 0.8% | | | 1.8% | Y |
| 10 | 3.0% | 3.0% | Name 5 | Y | 1M | Y | N | N | 0.3% | 0.4% | 0.5% | 0.6% | 0.8% | | | 1.8% | Y |
| 11 | 3.0% | 3.0% | Name 6 | Y | 1M | N | N | Y | 0.3% | 0.4% | 0.5% | 0.6% | | | | | Y |
| 12 | 3.0% | 3.0% | Name 7 | Y | 1M | Y | N | N | 0.5% | 0.4% | 0.5% | 0.6% | | | | | Y |
| 13 | 3.0% | 3.0% | Name 8 | Y | 1M | Y | N | N | 1.5% | 0.4% | 0.5% | 0.6% | | | | | Y |
| 14 | 3.0% | 3.0% | Name 9 | Y | 700K | Y | N | N | 1.5% | 0.4% | 0.5% | | | | | | Y |
| 15 | 3.0% | 3.0% | Name 10 | Y | 700K | N | N | N | 1.5% | 0.4% | 0.5% | | | | | | Y |
| 16 | 3.0% | 3.0% | Name 11 | Y | 700K | N | N | N | 2.0% | 0.4% | 0.5% | | | | | | Y |
| 17 | 3.0% | 3.0% | Name 12 | Y | 500K | N | N | N | 2.0% | 0.4% | 0.5% | | | | | | Y |
| 18 | 3.0% | 3.0% | Name 13 | Y | 500K | N | N | N | 2.0% | 0.4% | 0.5% | | | | | | Y |
| 19 | 3.0% | 3.0% | Name 14 | Y | 500K | N | N | N | 2.0% | 0.4% | 0.5% | | | | | | Y |
| 20 | 3.0% | 3.0% | Name 15 | Y | 300k | N | N | N | 2.0% | 0.4% | 0.5% | | | | | | Y |

*FIG. 5*

*Work Distribution Table*

| Employees | Band Value | Band Max Project No. |
|---|---|---|
| A, C, Z | 1M | 125 |
| E, L, M | 1M | 250 |
| B, G, I | 1M | 375 |
| H, R, T | 1M | 500 |
| J, N, P | 1M | 625 |
| F, K, O | 1M | 750 |
| Q, S, U | 1M | 875 |
| W, X, Y | 1M | 999 |

FIG. 6A

*Weighted Work Distribution Table*

| Employees | Band Value | Band Max Project No. |
|---|---|---|
| A, C | 1M | 050 |
| E, L, M, Z | 1M | 250 |
| B, G, I, Q | 1M | 450 |
| H, T | 1M | 500 |
| J, N, P, T | 1M | 700 |
| F, K, O, X | 1M | 900 |
| S, U | 1M | 950 |
| W, Y | 1M | 999 |

WORK ALLOCATION TOOL

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The disclosed embodiments relate generally to work management techniques. More specifically, the disclosed embodiments relate to systems and methods for managing the allocation of work.

BACKGROUND

In any corporate work environment, there needs to be a way to allocate new work projects to personnel. One approach is to allocate the work projects on a first-in-first-out basis where the projects are assigned according to when (e.g., date, time, etc.) they were received. Another approach is to put all work projects into an electronic pool and let each person choose his/her own work project on an as-needed basis. Still another approach is to have a trained specialist manually allocate each work project based on the knowledge and experience of the personnel needed to perform various tasks in the work projects.

Each of the above approaches has a drawback. For example, the first-in-first-out approach assumes that all employees have sufficient knowledge and experience to handle all work projects, which may or may not be the case depending on the type of work projects. The electronic pool approach leaves the selection of the work projects largely to the discretion of each person, who may or may not be tempted to pass over more pressing, but somewhat complex projects in favor of simpler projects. As for having a trained specialist manually allocate the work projects, this approach has been found to be the most effective in terms of making efficient use of the knowledge and experience of the available personnel. However, in a high-volume work environment where hundreds of work projects may need to be allocated on any given day, having a trained specialist make personnel decision for each work project is far too time-consuming and labor-intensive.

Accordingly, what is needed is a way to automate the selection of personnel for work projects and to automatically allocate the work projects to the personnel. More specifically, what is needed is a way to automatically allocate the work projects to the personnel in the manner that is equitable based on the complexity level of the work projects and the level of knowledge and experience of the personnel.

SUMMARY

The disclosed embodiments are directed to methods and systems for automatically allocating work projects to personnel based on work complexity level and level of knowledge and experience of the personnel. In one implementation, the methods and systems provide a work allocation tool that allows a user to input the level of complexity of the work projects according to one or more predefined criteria. The work allocation tool then automatically determines which of the available personnel has the required level of knowledge and experience to complete the work projects. Personnel who have already exceeded a target number or percentage of work projects in a given time period may be automatically excluded from the allocation. The work allocation tool thereafter randomly selects one of the available personnel and automatically allocates the work projects. An administrator interface allows a manager to define each person's target numbers or percentages and to stop further allocations if needed.

BRIEF DESCRIPTION OF THE DRAWINGS

The foregoing and other advantages of the invention will become apparent from the following detailed description and upon reference to the drawings, wherein.

DETAILED DESCRIPTION

The drawings described above and the written description of specific structures and functions below are not presented to limit the scope of what has been invented or the scope of the appended claims. Rather, the drawings and written description are provided to teach any person skilled in the art to make and use the inventions for which patent protection is sought. Those skilled in the art will appreciate that not all features of a commercial embodiment of the inventions are described or shown for the sake of clarity and understanding.

Persons of skill in this art will also appreciate that the development of an actual commercial embodiment incorporating aspects of the inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure.

It should be understood that the embodiments disclosed and taught herein are susceptible to numerous and various modifications and alternative forms. Thus, the use of a singular term, such as, but not limited to, "a" and the like, is not intended as limiting of the number of items. Also, the use of relational terms, such as, but not limited to, "top," "bottom," "left," "right," "upper," "lower," "down," "up," "side," and the like, are used in the written description for clarity in specific reference to the drawings and are not intended to limit the scope of the invention or the appended claims.

Particular embodiments are now described with reference to block diagrams and/or operational illustrations of methods. It should be understood that each block of the block diagrams and/or operational illustrations, and combinations of blocks in the block diagrams and/or operational illustrations, may be implemented by analog and/or digital hardware, and/or computer program instructions. Computer programs instructions for use with or by the embodiments disclosed herein may be written in an object oriented programming language, conventional procedural programming language, or lower-level code, such as assembly language and/or microcode. The program may be executed entirely on a single processor and/or across multiple processors, as a stand-alone software package or as part of another software package. Such computer program instructions may be provided to a processor of a general-purpose computer, special-purpose computer, ASIC, and/or other programmable data processing system.

The executed instructions may also create structures and functions for implementing the actions specified in the mentioned block diagrams and/or operational illustrations. In some alternate implementations, the functions/actions/structures noted in the drawings may occur out of the order noted in the block diagrams and/or operational illustrations. For example, two operations shown as occurring in succession, in fact, may be executed substantially concurrently or the operations may be executed in the reverse order, depending on the functionality/acts/structure involved.

Figure 1:
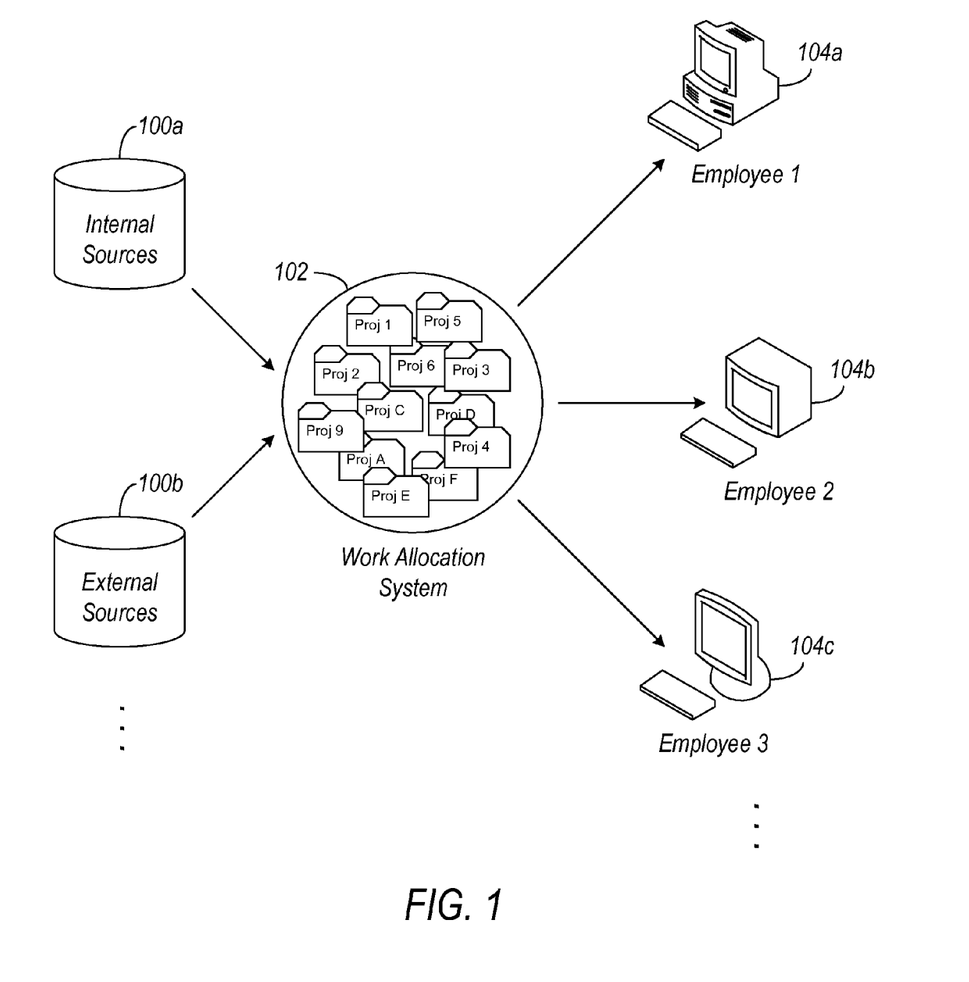
FIG. 1 illustrates an exemplary infrastructure for allocating work projects according to the disclosed embodiments.

Referring now to FIG. 1, an infrastructure for allocating work projects according to the disclosed embodiments is shown. For economy of the description, these embodiments are discussed only with respect to one type of work project, namely, insurance applications and specifically life insurance applications. However, those having ordinary skill in the art will understand that the disclosed embodiments are equally applicable to any type of work project where different levels of knowledge and experience may be required, including engineering-related projects, construction-related projects, marketing-related projects, finance-related projects, and the like.

As can be seen, the infrastructure includes internal and/or external sources 100a and 100b, respectively, from which the work projects (e.g., Projects 1, 2, 3, . . . , A, B, C, . . . , etc.) are provided to a work allocation system 102. The internal and/or external sources 100a-b may be any type of sources where work projects may be accumulated, such as one or more work project databases that hold various types of work projects. The databases may be specifically designated such that they record different types of work project. For example, some databases may store work projects from different business units of a company, while other databases may store work projects from different geographical regions of the company, and the like. Such work project databases may be, for example, SQL databases and other types of databases that are well known to those having ordinary skill in the art.

In operation, as new work projects from the internal and external sources 100a-b arise, or as existing work projects are rerouted through the infrastructure for additional processing, they are automatically provided to (or retrieved by) the work allocation system 102. A user, typically a project intake specialist, conducts an initial review of each work project, in this case, life insurance applications, to make sure it contains certain minimum requirements, such as the applicant's personal information. The project intake specialist then uses the work allocation system 102 to automatically and randomly select one of a plurality of employees, such as Employee 1 (104a), Employee 2 (104b), or Employee 3 (104c), to handle the work project. The work allocation system 102 thereafter automatically allocates the work project to the selected employee 104a-c for handling. Such an arrangement allows the selected employees 104a-c to receive their work project allocations most immediately and also provides a tremendous savings in time (as much as 15-20 man hours per day) and effort over the manual allocation approach used previously.

In addition, the work allocation system 102 only selects those employees 104a-c who have the required level of knowledge and experience to handle the work projects, as indicated by the project intake specialist. This ensures that the allocations are fair and equitable to the employees 104a-c insofar as they are only asked to handle work projects with commensurate complexity levels. As employees are often evaluated based on their throughput, allocating less complex work projects to more junior employees 104a-c allows the junior employees 104a-c to be fairly evaluated relative to their more experienced and presumably faster colleagues.

In some embodiments, one or more work projects may require handling by multiple employees 104a-c simultaneously. For example, life insurance applications often require handling by an underwriter as well as a business associate. In general, the business associate is responsible for various non-underwriting tasks related to the processing of the life insurance application, such as obtaining an applicant's medical records, scheduling any medical exams or tests needed by the applicant, and following up with the applicant on all open action items. The two work together to complement one another and often the work of one of them depends on the other one completing his/her work first. In accordance with the disclosed embodiments, the work allocation system 102 may be used to randomly select multiple employees 104a-c, such as an underwriter and a business associate, having knowledge and experience commensurate with the level of complexity of the work project.

Figure 2:
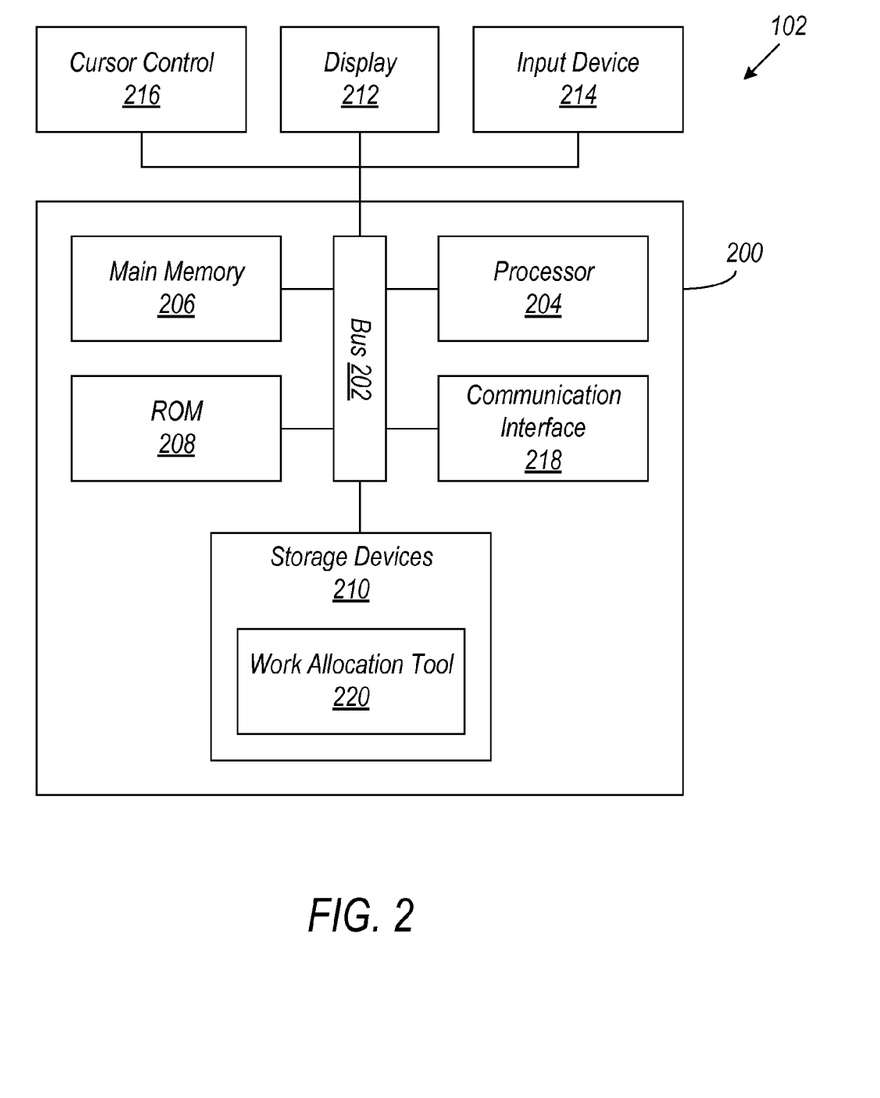
FIG. 2 illustrates an exemplary work allocation system for allocating work projects according to the disclosed embodiments.

FIG. 2 illustrates the work allocation system 102 in more detail according to the disclosed embodiments. As can be seen, in one embodiment, the work allocation system 102 may include at least one server 200. Any suitable server 200 known to those having ordinary skill in the art may be used as part of the work allocation system 102, including a workstation, a Web server, a main frame, and the like. Such a server 200 typically includes a bus 202 or other communication mechanism for communicating information and a processor 204 coupled with the bus 202 for processing information. The server 200 may also include a main memory 206, such as a random access memory (RAM) or other dynamic storage device, coupled to the bus 202 for storing computer readable instructions to be executed by the processor 204. The main memory 206 may also be used for storing temporary variables or other intermediate information during execution of the instructions to be executed by the processor 204. The server 200 may further include a read only memory (ROM) 208 or other static storage device coupled to the bus 202 for storing static information and instructions for the processor 204. A computer readable storage device 210, such as a magnetic disk or optical disk, may be coupled to the bus 202 for storing information and instructions for the processor 204.

The server 200 may be coupled via the bus 202 to a display 212, such as a cathode ray tube (CRT), for displaying information to a user. An input device 214, including, for example, alphanumeric and other keys, may be coupled to the bus 202 for communicating information and command selections to the processor 204. Another type of user input device may be a cursor control 216, such as a mouse, a trackball, or cursor direction keys for communicating direction information and command selections to the processor 204, and for controlling cursor movement on the display 212. The cursor control 216 typically has two degrees of freedom in two axes, a first axis (e.g., X axis) and a second axis (e.g., Y axis), that allow the device to specify positions in a plane.

The term "computer readable instructions" as used above refers to any instructions that may be performed by the processor 204 and/or other components. Similarly, the term "computer readable medium" refers to any storage medium that may be used to store the computer readable instructions. Such a medium may take many forms, including, but not limited to, non volatile media, volatile media, and transmission media. Non-volatile media may include, for example, optical or magnetic disks, such as the storage device 210. Volatile media may include dynamic memory, such as main memory 206. Transmission media may include coaxial cables, copper wire and fiber optics, including wires of the bus 202. Transmission media may also take the form of acoustic or light waves, such as those generated during radio frequency (RF) and infrared (IR) data communications. Common forms of computer readable media may include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Various forms of the computer readable media may be involved in carrying one or more sequences of one or more instructions to the processor 204 for execution. For example, the instructions may initially be borne on a magnetic disk of a remote computer. The remote computer can load the instructions into its dynamic memory and send the instructions over a telephone line using a modem. A modem local to the work allocation system 102 can receive the data on the telephone line and use an infrared transmitter to convert the data to an infrared signal. An infrared detector coupled to the bus 202 can receive the data carried in the infrared signal and place the data on the bus 202. The bus 202 carries the data to the main memory 206, from which the processor 204 retrieves and executes the instructions. The instructions received by the main memory 206 may optionally be stored on the storage device 210 either before or after execution by the processor 204.

The server 200 may also include a communication interface 218 coupled to the bus 202. The communication interface 218 typically provides a two way data communication coupling between the server 200 and the network 106. For example, the communication interface 218 may be an integrated services digital network (ISDN) card or a modem used to provide a data communication connection to a corresponding type of telephone line. As another example, the communication interface 218 may be a local area network (LAN) card used to provide a data communication connection to a compatible LAN. Wireless links may also be implemented. Regardless of the specific implementation, the main function of the communication interface 218 is to send and receive electrical, electromagnetic, optical, or other signals that carry digital data streams representing various types of information.

In accordance with the disclosed embodiments, a work allocation tool 220 and/or the computer-readable instructions therefor may also reside on the storage device 210. The computer-readable instructions for the work allocation tool 220 may then be executed by the processor 204 and/or other components of the server 200 to automatically and randomly select one or more employees 104a-c for the work projects based the level of complexity of the work projects and the level of knowledge and experience of the employees 104a-c. A user may thereafter use the work allocation tool 220 two automatically allocate the work projects to be employees 104a-c. Following is a description of exemplary implementations of the work allocation tool 220 according to the disclosed embodiments.

Figure 3:
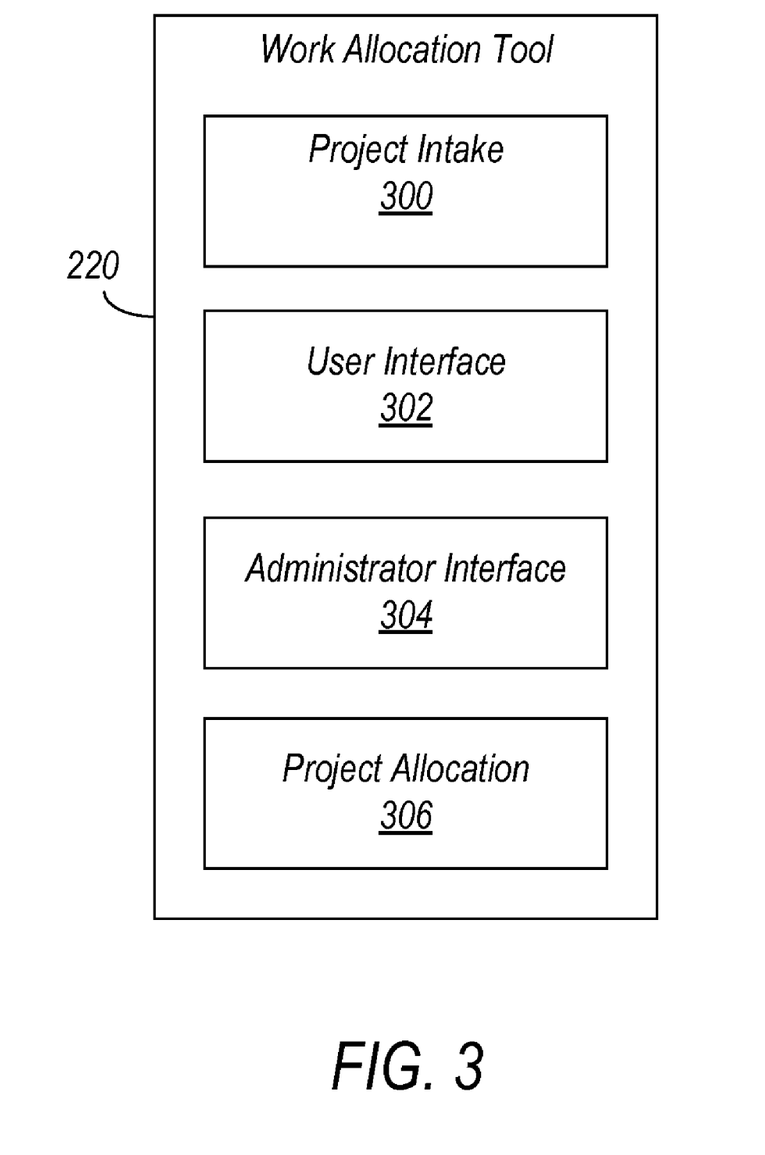
FIG. 3 illustrates an exemplary work allocation tool for allocating work projects according to the disclosed embodiments.

Referring to FIG. 3, in one implementation, the work allocation tool 220 may comprise a number of functional components, including a project intake module 300, a user interface module 302, an administrator interface module 304, and a project allocation module 306. These functional components may be software components written in a suitable programming or scripting language, hardware components encoded with suitable firmware instructions, or a combination of both. It should be noted that while several discrete components 300-306 are shown in FIG. 3, those having ordinary skill in the art will understand that one or more of these functional components may be combined into a single component and that any individual component may be divided into several constituent components as needed without departing from the scope of the disclosed embodiments.

In general, the project intake module 300 is configured to receive work projects from the internal and/or external sources 100a-b. Thus, the project intake module 300 connects the work allocation tool 220 to the internal and/or external sources 100a-b. Where the internal and/or external sources 100a-b are databases, the project intake module 300 may implement any communication protocols that may be needed for the project allocation tool 220 to communicate with each database. In some embodiments, the project intake module 300 may also need to convert the data in each database into a form (e.g., XML, text, etc.) that is compatible with or can be used by the project allocation tool 220. In other embodiments, the project intake module 300 may be configured to combine multiple types of work projects where one work allocation tool 220 manages work projects across multiple business units and/or geographical regions. The project intake module 300 may also be configured to allow appropriate personnel to manually enter new projects into the project allocation tool 220 using a set of predefined data entry fields.

Once a work project has been taken in, the user interface module 302 allows a user using the work allocation tool 220 to automatically allocate the work project. Such a user interface module 302 may be manifested in the form of a graphical user interface, a telephone interface, or some other suitable interface. In one implementation, the work allocation tool 220 allows the user to input the level of complexity of the work projects according to one or more predefined criteria. The one or more criteria may be any criteria suitable for evaluating the complexity of a work project known to those having courting a skilled in the art. For life insurance applications, such criteria may include the amount of death benefit being sought, whether certain disorders or illnesses are indicated, whether the applicant is morbidly overweight, and the like. The user interface module 302 then automatically presents the name of a randomly-selected personnel having the required level of knowledge and experience to complete the work projects to the user. The user may then proceed with the allocation by clicking an appropriate button, or in some implementations, the allocation may be performed automatically without any action from the user.

If the user happens to be a manager, the administrator interface module 304 allows the user or other authorized personnel to define a maximum workload for each employee 104a-c. The workload may be based, for example, on a certain maximum number of work projects allocated to an employee 104a-c per day, a maximum percentage of the total number of work projects to be allocated to available employees 104a-c per day, and the like. The administrator interface module 304 allows the user to turn off an employee 104a-c or otherwise stop additional work projects from being allocated to the employee 104a-c once the user sees that the employee 104a-c has exceeded his/her target maximum workload. Conversely, the user may turn on an employee 104a-c to receive additional work projects if the user thinks the employee 104a-c has additional capacity. The user may also increase or decrease an employee's 104a-c target maximum workload as needed. Such an arrangement is consistent with a main benefit of the work allocation tool 220, namely, to provide fair and equitable allocation of work projects.

Finally, the project allocation module 306 performs the actual automatic and random selection of an employee 104a-c based on the level of complexity of the work project indicated by the user. As mentioned above and by way of an example, the level of complexity for life insurance applications may be based on the death benefit being sought by the applicant, although other indicators may certainly be used. In general, a higher death benefit requires handling by an employee 104a-c with more knowledge and experience. Once the user has indicated a level of complexity for the work project, the project allocation module 306 narrows the group of available employees 104a-c to those who have the requisite knowledge and experience to handle that work project. The project allocation module 306 thereafter randomly chooses one of the eligible employees 104a-c from the narrowed group of employees 104a-c to receive the work project.

In one implementation, the random selection may be performed by making every employee 104a-c in the narrowed entire group of eligible employees 104a-c available to be chosen for the work project. In other implementations, however, the eligible employees 104a-c may be further divided into subgroups, and only employees 104a-c in certain subgroups are eligible for certain work projects. For example, as each new work project is received, the work project may be given a unique work project number. Each eligible employee 104a-c (i.e., the ones with the requisite knowledge and experience) may then be assigned a range of numbers such that he/she may only be allocated a work project with a work project number that falls within his/her range.

Where more than one employees 104a-c may be allocated a given work project, the project allocation module 306 may be configured so that the same pair or set of employees 104a-c are not assigned the same work projects over and over again. For example, both underwriters and business associates may be assigned to a given life insurance applications. Having them assigned to the same work projects over and over again may mean that one of them is constantly waiting on the other one to complete some tasks, which may not be a desirable or efficient use of resources.

To avoid the situation where an underwriter and a business associate who happen to be assigned to the same range of numbers are working on the same work projects over and over again, a different portion of the work project number may be used to select the underwriter versus the business associate. For example, the last three digits (or some other portion) of the work project number may be used to select the underwriter, whereas the first three digits (or some different portion) of the work project number may be used to select the business associate. Such an arrangement decreases the likelihood that the same pair or set of employees 104a-c are repeatedly assigned to the same work projects.

Specific implementations of some of the functions of the functional components 300-306 of the work allocation tool 220 are shown in FIGS. 4-5 and 6A-6B.

Figure 4:
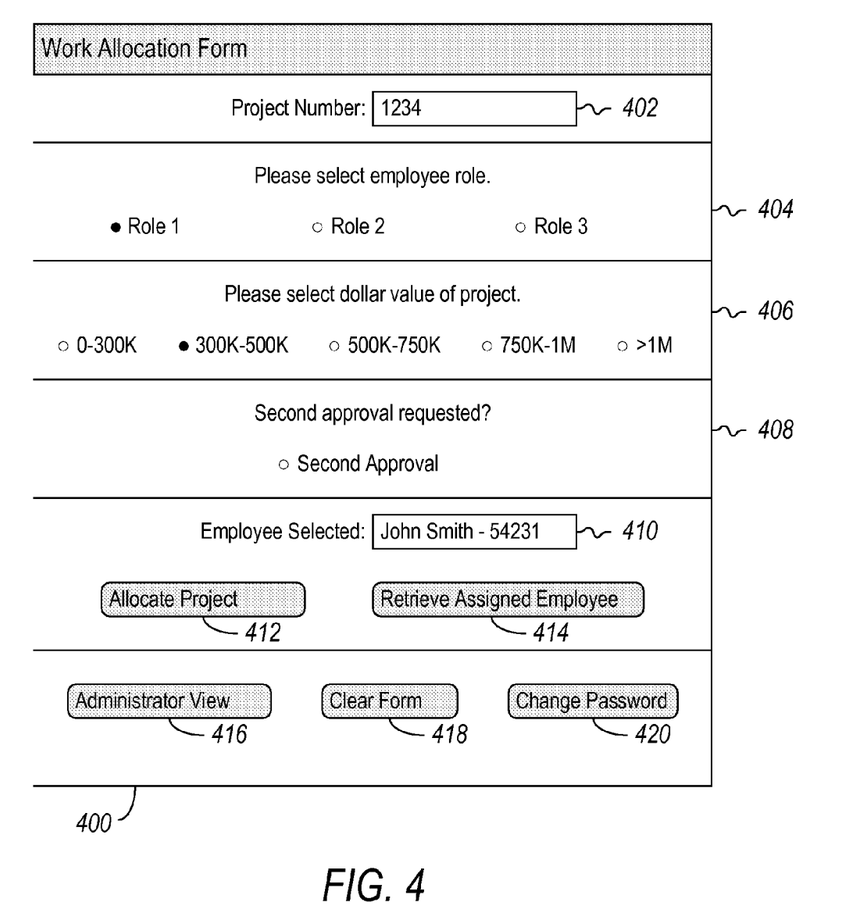
FIG. 4 illustrates an exemplary work allocation form for allocating work projects according to the disclosed embodiments.

Referring now to FIG. 4, an exemplary work allocation form 400 configured according to the disclosed embodiments is shown. The particular work allocation form 400 displayed is one that may be particularly useful for allocating life insurance applications, although other types of work projects may also benefit from the use of the work allocation form 400. As can be seen, the work allocation form 400 may include a project number field 402 where the user may manually enter the identification number of a work project, such as a life insurance application, to be allocated. It is also possible for the work allocation form 400 to automatically retrieve the project number of the next life work project to be allocated. In the example shown, the particular work project to be allocated as a project number of "1234."

Below the project number field 402 is an employee role indicator 404 for allowing the user to select the type of employee 104a-c to which the work project should be allocated. There are three employee roles available in the example shown here, but those having ordinary skill in the art will understand that fewer or additional employee roles may be used as needed depending on the type of work project. For life insurance applications, the three employee roles may correspond to an underwriter, a business associate, and an underwriting specialist. The latter employee role, underwriting specialist, may be a highly experienced underwriter who capable of handling extremely high death benefit life insurance applications, or applications that include an attending physician statement, which typically indicates the applicant may have health issues.

A complexity indicator 406 allows the user to indicate the level of complexity for the work project to be allocated. Consistent with life insurance applications, the level of complexity may be indicated according to the dollar value range of the death benefit being sought, including $0-$300,000, $300,000-$500,000, $500,000-$750,000, $750,000-$1,000,000, and greater than $1,000,000. In general, the higher the death benefit value, the more complex the life insurance application is considered to be, and hence the greater the level of knowledge and experience required. Similarly, it is expected the number of life insurance applications that need to be allocated for a given dollar value range will decrease as the dollar value range increases.

In some implementations, a second approval option 408 may be provided to allow the user to request verification or a second approval for applications that appear to be particularly difficult or complex, such as applications involving health issues, applications where the death benefit is disproportionately higher than the applicant's income, and the like.

An employee selected field 410 displays the name of the employee 104a-c selected for the work project, namely John Smith in this example, along with his/her employee number in some cases. The name of the employee selected for the work project may be displayed automatically via the work allocation form 400 once the user completes the project number field 402, the employee role indicator 404, and the project complexity indicator 406. In some implementations, displaying the name of the employee 104a-c selected automatically causes the work project to be allocated to that employee 104a-c. In other implementations, however, an allocate project button 412 may be provided to allow the user to allocate the work project to the employee 104a-c displayed. A retrieved assigned employee button 414 allows the user to pull up a profile containing additional information on the assigned employee.

Also present in the work allocation form 400, in some embodiments, are several administrative buttons, including an administrator view button 416 for allowing an authorized user to access various administrative functions. Any of your form button 418 allows the user to reset the work allocation form 400, and any change password button 420 allows the user to update this security feature as needed.

Figure 5:
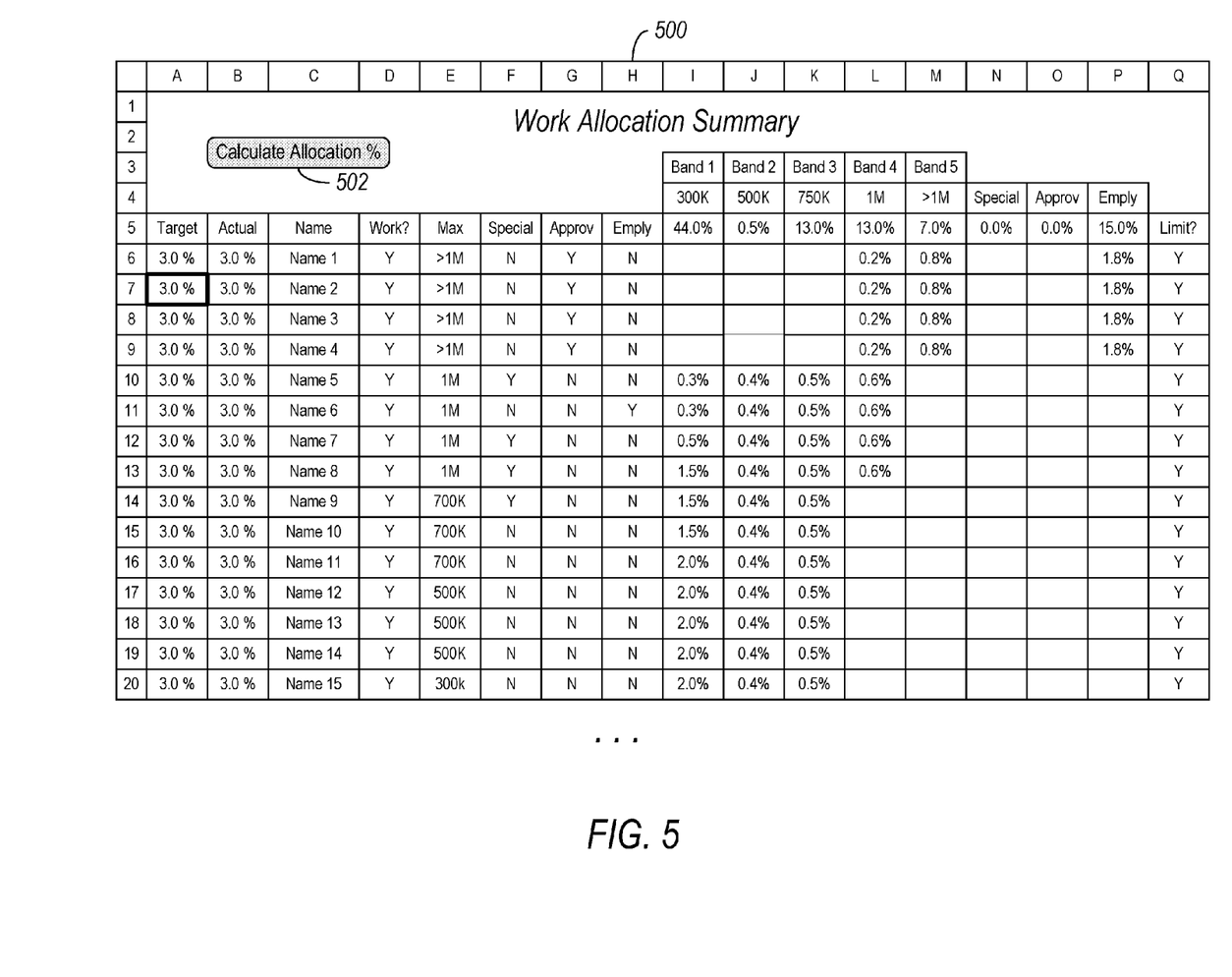
FIG. 5 illustrates an exemplary work allocation summary screen for allocating work projects according to the disclosed embodiments.

Clicking on the administrator view button 416 takes the user to a work allocation summary screen 500, an example of which is shown in FIG. 5. In some implementations, the work allocation summary screen 500 provides a summary of the work load status of the various employees 104a-c to whom work projects are being allocated along with the knowledge and experience of each employee 104a-c. In the life insurance example shown here, the knowledge and experience of the employees 104a-c may be expressed in terms of the maximum death benefit the employee 104a-c is eligible to handle. Following is a description of the various columns of data in the work allocation summary screen 500.

Beginning at the left of the work allocation summary screen 500, a "Target" percentage column may be provided that shows the desired maximum workload the user would like to maintain for each employee 104a-c in terms of the percentage of the total work projects to be allocated during a given day. Thus, if there are twenty employees, all of whom are to receive nearly the same workload, then each employee would have a target percentage of 5.0%. And if there are five hundred work projects to be allocated during a given day, an employee 104a-c having a target of 5.0% should receive no more than twenty-five work projects during the day. Both of these numbers may be automatically generated by the work allocation tool 220 in some embodiments, and/or one or more of them may be manually set by the user. In actuality, however, the employee 104a-c may receive fewer or greater than 5.0%, which actual percentage may be reflected in an "Actual" percentage column, as shown. Ideally, by virtue of the random selection process used by the work allocation tool 220, the "Target" percentage column and the "Actual" percentage column should be nearly the same.

To the right of the "Actual" percentage column may be a "Name" column where the names of the various employees 104a-c are listed. Next to that may be a "Work?" column for indicating whether the employee 104a-c is open to additional work projects (i.e., turned on) or closed to additional work projects (i.e., turned off). A "Max" column may indicate the maximum death benefit a particular employee 104a-c is eligible to handle. A "Special" column may indicate whether the employee 104a-c is qualified to handle, for example, extremely high death benefits or other special cases. An "Approval" column may indicate whether the employee is qualified to provide second approvals (FIG. 4), and an "Emply" column may indicate whether the employee 104a-c is designated to handle life insurance applications received from other employees 104a-c of the company.

In some implementations, columns labeled "Band 1," "Band 2," "Band 3," "Band 4," and "Band 5" may be provided in the to indicate the percentage of life insurance applications having death benefits in the respective bands that are being handled by each employee 104a-c. Thus, for example, employee "Name 1" has been allocated 0.2% of all life insurance applications having a death benefit between $750,000 and $1,000,000 (Band 4) during the day and 0.8% of all life insurance applications having a death benefit greater than $1,000,000 (Band 5) during the day. The total percentage of all life insurance applications having a death benefit between $750,000 and $1,000,000 (Band 4) and greater than $1,000,000 (Band 5) is 13.0% and 7.0%, respectively. In accordance with the disclosed embodiments, the work allocation tool 220 automatically takes into account the knowledge and experience level of the employees 104a-c to thereby allocate higher death benefit applications first to those employees 104a-c who are eligible for such applications, while employees 104a-c who are not eligible for such applications are allocated applications with lower death benefits first, as shown.

A second "Special" column, "Approval" column, and "Emply" column may be displayed to indicate the percentage of life insurance application being handled by each employee 104a-c that are either extremely high dollar value, require a second approval, or received from other employees 104a-c, respectively. Finally, a "Limit?" column may be provided to indicate whether an employee 104a-c has reached or exceeded his/her target limit for the day, as reflected in the "Actual" column.

To change the target percentage for an employee 104a-c or to stop additional work projects from being allocated to the employee, the user may simply select the field of interest and make the desired change. A button 502 allows the user to calculate and recalculate the percentages for the various employees as needed. It is also possible for the work allocation tool 220 to automatically turn off the user from receiving additional work, for example, once his/her actual percentage exceeds the target percentage. Note that although percentages have been used herein, those having ordinary skill in the art will understand that absolute numbers may be used in place of, or in addition to, the percentages without departing from the scope of the disclosed embodiments.

Figure 6A:
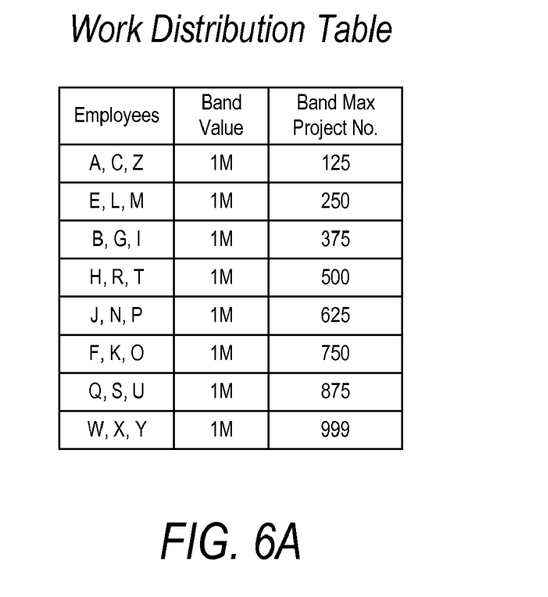
FIGS. 6A-6B illustrate exemplary work distribution tables for allocating work projects according to the disclosed embodiments.
Figure 6B:
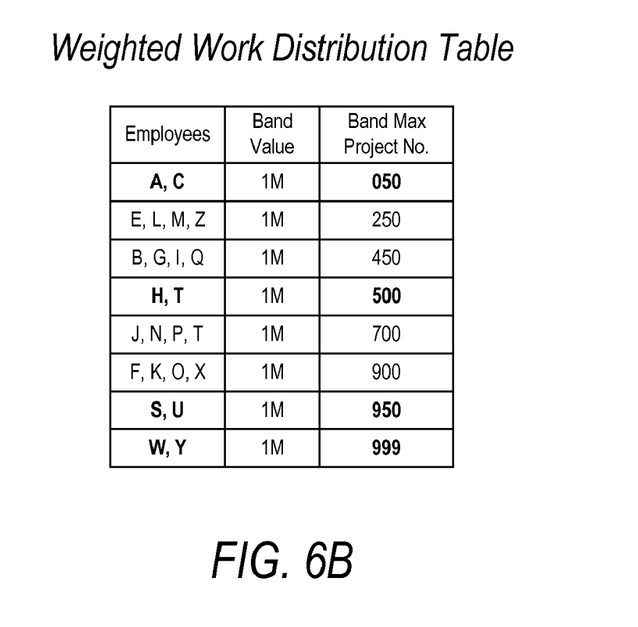

As mentioned above, the work allocation tool 220 uses a random selection process that takes into account the level of knowledge and experience of the employee 104a-c. FIGS. 6A-6B are work distribution tables that illustrate one example of a random selection scheme that may be used by the work allocation tool 220. Of course, those having ordinary skill in the art are certainly capable of devising other random selection schemes that take into account the level of knowledge and experience of the employees 104a-c without departing from the scope of the disclosed embodiments.

Referring now to the work distribution table shown in FIG. 6A, the first column lists all employees who are eligible to handle life insurance applications having certain values of death benefit, for example, death benefits between $750,000 and $1,000,000. This particular death benefits band is reflected in the second column of FIG. 6A. Each employee may then be randomly assigned to one of several ranges of work project identification numbers, as shown in the third column (recall that each work project to be allocated has a unique project number).

The number of ranges may be a predefined fixed number for each band, or it may be dynamically generated by the work allocation tool 220 based on the number of work projects to be allocated during the day for that band. For example, if there are a thousand work projects with death benefits between $750,000 and $1,000,000 to be allocated that day, the work allocation tool 220 may generate ten different ranges, whereas only two different ranges may be needed if there are only a hundred such work projects to be allocated. In either case, the ranges typically have equal widths, but it may be desirable to have unequal equal widths in some cases for weighting purposes (as demonstrated with respect to FIG. 6B).

In the example of FIG. 6A, only the last three digits (or some other portion) of a work project's identification number are considered in order to avoid the situation described above where an underwriter and a business associate are assigned to the same work projects over and over again. The first three digits (or some different portion) of the work project's identification number may then be used for employees having a different role from the employees listed here. Still other digits or portions of the work project's identification number may be used for other employee roles as needed.

In accordance with the disclosed embodiments, when a work project is to be allocated, the work allocation tool 220 first determines the death benefits band of the work project, then compares the last three digits of the work project's identification number to see in which range of the band the work project falls. The work allocation tool 220 thereafter randomly selects one of the employees in that range to receive the work project. In this way, a random, but fair and equitable distribution of work projects may be achieved in a timely manner with minimal manual interaction and effort by the user.

In some embodiments, some employees may have specialized knowledge and experience such that they are the only ones who can handle certain work projects. As a result, these employees may be exposed to a higher number of work projects than other employees who have no specialized knowledge or experience. In order to make the distribution process more fair and equitable for these specialized employees, the work distribution scheme shown in the table of FIG. 6A may be weighted to lessen the exposure of the specialized employees.

An example of a weighted distribution table is illustrated in FIG. 6B. As can be seen, the weighted distribution table is similar to the work distribution table of FIG. 6A, except that employees A, C, H, T, S, U, W, and Y are highlighted to indicate they have highly specialized knowledge and experience. That is, these employees are eligible for certain specialized work projects in addition to the work projects normally allocated in the band shown. Examples of such specialized work projects may include life insurance applications where health issues are involved, where the death benefit being sought is disproportionately higher than the applicant's income, and the like.

In accordance with the disclosed embodiments, the work allocation tool 220 may group these specialized employees together in the same ranges and may reduce the size of the ranges for these specialized employees. Likewise, the work allocation tool 220 may group the other, non-specialized employees in the same ranges and may increase the size of the ranges for these employees. Thus, looking at the first two rows of the weighted distribution table, employees A and C are only exposed to work projects having identification numbers ending in 000 to 050, whereas employees E, L, M, and Z are exposed to work projects having identification numbers ending in 051 to 250. The specific size of the weighted ranges may be varied according to the number of specialized work projects that the specialized employees may be expected to receive. Such a weighted distribution table may then be used to provide a more fair and equitable distribution of work projects.

Figure 7:
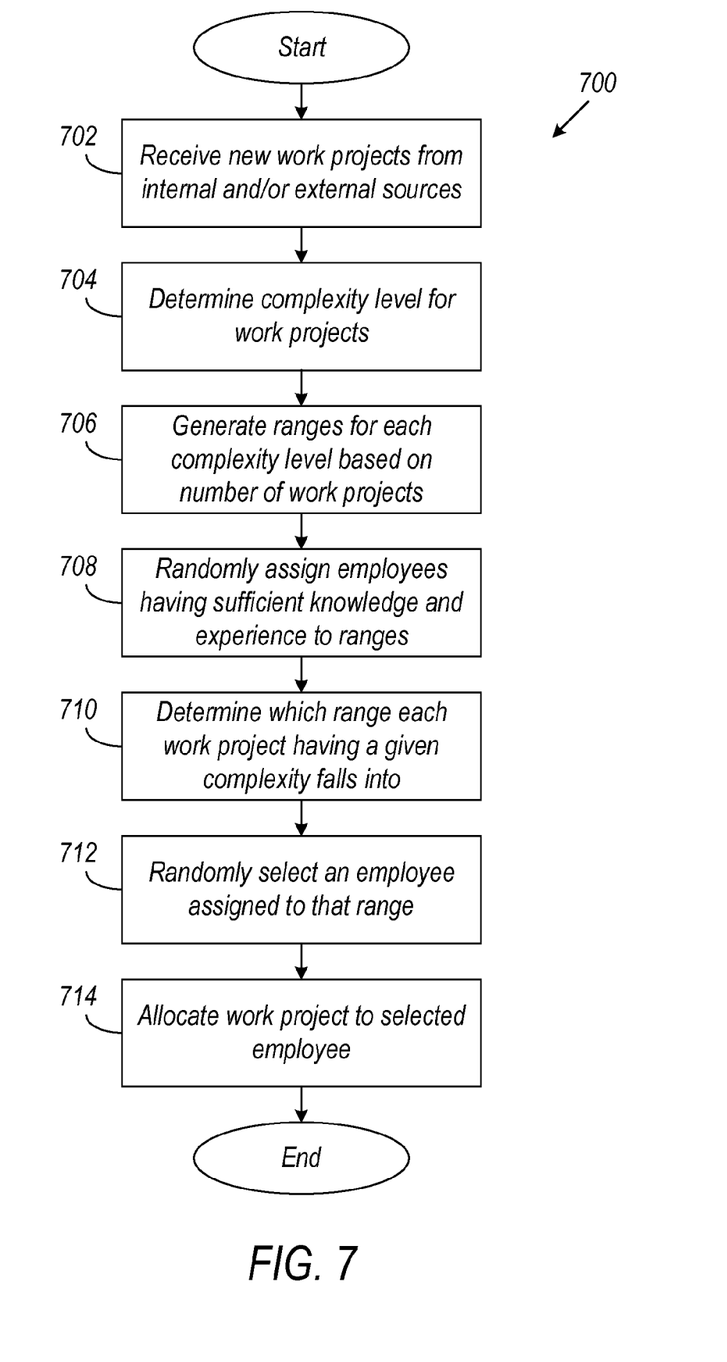
FIG. 7 illustrates a method for allocating work projects according to the disclosed embodiments.

Thus far, specific embodiments have been disclosed for automatically allocating a work project to an employee. Referring now to FIG. 7, general guidelines are shown in the form of a method 700 that may be used to implement the various embodiments disclosed above. As can be seen, the method 700 begins at block 702, where new work projects are received, for example, from an internal and/or external source. At block 704, a determination is made as to the complexity level for each work project. For life insurance applications, the complexity level may correspond to on the death benefit being applied for. For other types of work projects, one or more different criteria may be used to determine the complexity level.

At block 706, ranges of work project identification numbers are generated. The number of ranges generated for each complexity level may depend on the total number of work projects that are to be allocated at a particular complexity level. The greater the number of work projects that are to be allocated at a particular complexity level, the greater the number of ranges that need to be generated. At block 708, employees having sufficient knowledge and experience for a given complexity level are randomly assigned to each range for that complexity level. At block 710, a determination is made as to which range each work project falls into for a given complexity level. A random selection of an employee assigned to that range is made at block 712, and the work project is allocated to the selected employee at block 714.

While the disclosed embodiments have been described with reference to one or more particular implementations, those skilled in the art will recognize that many changes may be made thereto. Therefore, each of the foregoing embodiments and obvious variations thereof is contemplated as falling within the spirit and scope of the disclosed embodiments, which are set forth in the following claims.

What is claimed is:

1. A non-transitory computer-readable medium encoded with computer-readable instructions for processing work projects, the computer-readable instructions comprising instructions executed by a computer to:
   receive a work project to be allocated to at least one person, wherein the work project includes a life insurance application, the work project having a predefined complexity level, wherein the complexity level is defined by a range of value of a death benefit requested in the life insurance application, the complexity level increasing with the value of the death benefit requested in the life insurance application;
   randomly select the at least one person to handle the work project, the at least one person having a level of knowledge and experience corresponding to the complexity level of the work project;
   allocate the work project to the at least one person being selected to handle the work project; and
   display a summary of personnel to whom work projects have been allocated according to the level of knowledge and experience of the personnel, the summary including a target workload for each person, the target workload being indicative of a maximum workload that should be allocated to each person.

2. The non-transitory computer-readable medium of claim 1, further comprising instructions for causing a computer to determine a complexity level of the work project based on one or more predefined criteria.

3. The non-transitory computer-readable medium of claim 1, further comprising instructions for causing a computer to generate one or more ranges of work project identification numbers for the complexity level, the ranges generated being dependent on a total number of work projects to be allocated over a predefined period of time that have substantially the same complexity level.

4. The non-transitory computer-readable medium of claim 3, further comprising instructions for causing a computer to determine which range of the generated ranges the work project falls into.

5. The non-transitory computer-readable medium of claim 3, further comprising instructions for causing a computer to randomly assign one or more employees having knowledge and experience corresponding to the complexity level to each one of the generated ranges.

6. The non-transitory computer-readable medium of claim 3, further comprising instructions for causing a computer to weigh one or more of the generated ranges to accommodate employees having specialized knowledge and experience.

7. The non-transitory computer-readable medium of claim 1, wherein the work project to be allocated is received from one of: a source internal to a company, and a source external to the company.

8. A non-transitory computer-readable medium encoded with computer-readable instructions for allocating work projects to appropriate personnel, the computer-readable instructions comprising instructions executed by a computer to:
   present a work project to be allocated to a work allocation tool wherein the work project includes a life insurance application;
   provide a complexity level for the work project to the work allocation tool, wherein the complexity level is defined by a range of value of a death benefit requested in the life insurance application, the complexity level increasing with the value of the death benefit requested in the life insurance application;
   indicate an employee role for the work project to the work allocation tool;
   receive an identifier for at least one person selected by the work allocation tool to handle the work project, the at least one person having a level of knowledge and experience corresponding to the complexity level of the work project; and
   display a summary of personnel to whom work projects have been allocated according to the level of knowledge and experience of the personnel, the summary including a target workload for each person, the target workload being indicative of a maximum workload that should be allocated to each person.

9. The non-transitory computer-readable medium of claim 8, further comprising instructions for causing a computer to allocate the work project to the at least one person selected by the work allocation tool, the allocating being performed according to one of: automatically by the work allocation tool, and manually by the user.

10. The non-transitory computer-readable medium of claim 8, wherein the at least one person is one of: an underwriter for the life insurance application, and a business associate for the life insurance application.

11. The non-transitory computer-readable medium of claim 8, wherein the work project includes one of an engineering-related work project, a construction-related work project, a marketing-related work project, and a financing-related work project.

12. The non-transitory computer-readable medium of claim 8, wherein the work project includes one of a new work project and a work project that is being rerouted for further processing.

13. A method for managing allocation of work projects, the method comprising:
   presenting, with a computing device, a work project to be allocated to a work allocation tool wherein the work project includes a life insurance application;
   providing a complexity level for the work project to the work allocation tool, wherein the complexity level is defined by a range of value of a death benefit requested in the life insurance application, the complexity level increasing with the value of the death benefit requested in the life insurance application;
   indicating an employee role for the work project to the work allocation tool;
   receiving an identifier for at least one person selected by the work allocation tool to handle the work project, the at least one person having a level of knowledge and experience corresponding to the complexity level of the work project; and
   displaying a summary of personnel to whom work projects have been randomly allocated according to a level of knowledge and experience of the personnel, the summary including a target workload for each person, the target workload being indicative of a maximum workload that should be allocated to each person;
   allowing a user to make modifications to the target workload for each person; and
   recalculating the target workload for each person based on the modifications.

14. The method of claim 13, further comprising instructions for causing a computer to allow the user modify the summary of personnel for each person to receive one of: additional work projects, and no additional work projects.

15. The method claim 13, wherein the summary of personnel further includes an indicator indicating the level of knowledge and experience of each person.

16. The method of claim 13, wherein the summary of personnel further includes an indicator indicating whether each person has any specialized knowledge or experience.

17. The method of claim 16, wherein the summary of personnel further includes a specialized work project workload for each person.

18. The method of claim 13, wherein each work project has a respective complexity level and the summary of personnel further includes a complexity level workload for each person.

19. The method of claim 13, wherein the summary of personnel further includes an actual workload for each person, the actual workload indicative of a number of work projects that have been actually allocated to each person.

* * * * *